United States Patent Office 3,382,138
Patented May 7, 1968

3,382,138
PROCESS AND ARTICLES INVOLVING CO-
DEPOSITION OF LATEX AND POLY-
URETHANE
Harry J. Barth, Spartanburg, S.C., assignor, by mesne assignments, to International Latex & Chemical Corporation, Dover, Del., a corporation of Delaware
No Drawing. Filed Nov. 4, 1964, Ser. No. 408,767
24 Claims. (Cl. 161—190)

ABSTRACT OF THE DISCLOSURE

Composite structure of a layer of uncoagulated latex over which is superposed a polyurethane in a solvent, the solvent being the coagulant of the latex.

This invention relates to composite structures comprising at least one layer of latex rubber and at least one layer of elastomeric polyurethane intimately bonded together and to processes for producing such structures. In particular, this invention relates to composite articles of codeposited layers of latex rubber and elastomeric polyurethanes bonded together and to processes for producing the same.

Natural and synthetic rubbers have many properties which make them commercially valuable. Resiliency, elasticity, and other mechanical properties are such that natural and synthetic rubbers have been used in a variety of rubber products. Such rubbers can be compounded to have the required strength and mechanical properties necessary for their use in rubber products. However, many natural and synthetic rubbers when compounded into ultimate commercial products are limited in the properties of abrasion and/or wear resistance.

For example, many articles made of films of deposited latex rubber, such as, girdles, gloves, swim suits, bathing caps, sheetings, overshoes, and the like, are exposed to conditions which tend to degrade the rubber and shorten the service life of the goods. Abrasion, aging, oxidation, attack by ozone, body oils and other oils or greases have a deteriorating effect. Consequently, protective coatings on such exposed latex film which would prolong the service life of articles containing the same are highly desirable.

Similarly, many articles made of extruded latex rubber such as, threads, ribbons, fabrics, sheets, are also exposed to conditions which tend to degrade the rubber and thus shorten the service life of the goods. Hence, coatings which would prolong service life, as well as give excellent adherence to such articles, are also highly desirable.

Urethane polymers which are a class of synthetic rubbers possess certain unique properties which make them extremely desirable in compounding commercial rubber products. Specifically, urethane rubbers have outstanding abrasion and wear resistant properties; however, urethane rubbers are relatively expensive when compounded into commercial products as compared with natural or other synthetic rubber products. Furthermore, difficulty has been encountered in producing articles of natural and/or synthetic rubber having a coating of polyurethane polymers which is adherent and possesses sufficient elasticity to avoid breaking or delamination when the composite article is stretched in service. Oftentimes additional adhesives and/or cross-linking agents are necessary to effect a secure bond between polyurethane and natural and/or synthetic rubbers.

This invention contemplates composite articles, that is, films, sheets, threads, and the like comprising at least one layer or coating of elastomeric polyurethane bonded to a coating or layer of latex rubber which is highly adherent and which is resistant to delamination. In addition, this invention further contemplates processes for producing such composite elastomeric polyurethane-latex rubber articles by effecting codeposition of a layer of rubber latex from an aqueous dispersion and a layer of elastomeric polyurethane from a solution containing a solvent which dissolves said polyurethane and serves to coagulate said rubber latex.

As used in this specification and in the appended claims certain words and phrases are intended to have the following definitions:

The term "rubber" includes both natural and synthetic rubbers.

The term "polyurethane" includes polymeric urethane compounds produced by an addition or condensation reaction between polyisocyanates (difunctional or higher) and suitable active hydrogen compounds such as glycols, polyesters, polyethers, and the like as hereinafter set forth.

The term "protonating solvents" include proton donating substances which are capable of dissolving elastomeric polyurethane materials and also coagulating natural or synthetic rubber latices and include, for example, formic acid, acetic acid, propionic acid, and the like.

The term "codeposition" as used herein refers to the simultaneous deposition of a layer of polyurethane from solution together with a layer of coagulated rubber latex from a dispersion thereof.

In one embodiment of this invention the codeposited layers of polyurethane and rubber latex are produced by dipping a form into a solution of the polyurethane elastomer which is dissolved in a protonating solvent, removing a coated form from the polyurethane solution and then dipping the coated form into an aqueous dispersion of rubber latex for a time sufficient to allow coagulation of a layer of latex rubber onto the coating of polyurethane elastomer. The coated form may then be removed from the latex dried, and cured, e.g., by mild heating. Advantageously the coated form can be redipped into additional solutions of polyurethane and/or aqueous dispersions of rubber latex to produce a multi-layer laminaate of polyurethane elastomer and latex rubber, which can be cured by heating or the like.

In another embodiment of this invention a polyurethane-coated body or layer of rubber latex may be produced by dipping a form into an aqueous dispersion of rubber latex one or more times and after a short time dipping the latex coated form into a solution of urethane polymer which is dissolved in the protonating solvent. In this manner the rubber latex is coagulated and a coating of polyurethane elastomer is strongly adhered to the coagulated latex film. After a short setting period, the resulting composite article may be subjected to a final curing step, e.g., a mild heat treatment.

It will be appreciated that the rubber latex may be extruded in the form of a fiber, thread, sheet, or the like directly into a coagulant bath containing the protonating solvent of this invention having the urethane polymer dissolved therein and drawn from the bath to produce a composite rubber polyurethane article. By utilization of this technique, a highly desirable latex thread having a coating of polyurethane elastomer strongly bonded thereon may be produced. In employing this process for producing extruded threads having a polyurethane elastomer coating thereon, not only is the conventional step of coating by dipping the thread in the desired impregnating solution omitted, but, advantageously, elastomer-to-thread bond is produced without requiring special adhesives and cross-linking agents commonly used by the prior art.

Rubber latices which may be bonded to polyurethane elastomers by the process of this invention include natural and synthetic rubber latices as well as mixtures of the two. Among suitable synthetic rubber latices may be mentioned GR-S (an emulsion copolymer of butadiene and styrene), nitrile latices (emulsion copolymers of butadiene and acrylonitrile), butyl latices (copolymers of isobutylene and isoprene), neoprene, thiokols (polymers prepared by treating sodium polysulfide with dihalogenated materials) butadiene-carboxylic acid latices, synthetic isoprene, and other elastomeric polymer latices. It is a particular advantage of the present invention that when the rubber is employed as a substrate it need not be vulcanized or cured prior to the application of the polyurethane elastomer coating. Conversely, the urethane polymer coating need not be cured prior to curing of the rubber substrate. Thus, the invention advantageously permits curing of both the rubber latex base and the urethane polymer coating at substantially the same time and under the same conditions.

The polyurethane polymers suitable for the purposes of this invention may be those which upon curing will form elastomeric layers or coatings having physical properties sufficiently similar to those of the latex rubber coating or substrate to avoid failure of the elastomer coating upon subjecting the substrate to repeated flexing and stretching within the limits of its ultimate elongation. In this regard, those polyurethane elastomers which in cured unsupported films exhibit ultimate elongations not substantially less than about one-half that of the rubber substrate and a 300% moduli not substantially greater than about three times that of the vulcanized latex rubber are capable of maintaining an adherent bond. In general, any polyurethane elastomer may be employed which can be dissolved in a protonating solvent and subsequently bonded to a latex rubber layer by the practice of the invention. Particularly preferred are those elastomeric polyurethanes which possess the unique ability to self-cure under ambient conditions; that is without requiring additional curing agents and/or elevated temperatures.

The polyurethane elastomers used in accordance with this invention may be prepared by the methods known and described in the prior art. The polyurethane elastomers are usually prepared from a long chain diol such as a linear polyester or polyether, preferably of molecular weight 1000 to 2000, a polyisocyanate, preferably a diisocyanate and a low molecular weight chain extender such as a glycol or a diamine.

While several reactions sequences are known to the art and thus may be used to prepare the polyurethane elastomers, one of the most successful is the "prepolymer" method. In the first step of this method the diol is caused to react with an excess of diisocyanate and the reaction product thus obtained is a liquid or low melting solid of a moderate molecular weight and which is referred to as a "prepolymer." The second step of this method is the addition of a low molecular weight glycol or diamine, with the ratio of reactants usually being chosen so that a slight excess of isocyanate groups is present. These isocyanate-terminated prepolymers may advantageously be blocked or capped, that is, the terminal isocyanate groups may be reacted to stabilize the prepolymer against premature cure by atmospheric moisture. The capping agents may be any active hydrogen substance which may be volatilized or removed upon regeneration to free the isocyanate groups at temperatures below that adverse to the rubber substrate and which will not degrade said rubber substrate. Preferably, these isocyanate precursors should be decomposable at temperatures not over about 250 to 300° F., preferably 200 to 275° F. Examples of such blocking agents are diethyl malonate, acetoacetate and acetylacetone and sodium bisulfite.

Suitable organic polyisocyanates for use in the process of the present invention include polyisocyanates described in the prior art as suitable for use in the preparation of polyurethane elastomers. Non-limiting examples of suitable organic polyisocyanates include aliphatic diisocyanates such as hexamethylene diisocyanate, aromatic diisocyanates, such as tolylene-2,4-diisocyanate; tolylene-2,6 - diisocyanate; diphenylmethane - 4,4' - diisocyanate; 3-methyldiphenylmethane-4,4'-diisocyanate; m- and p-phenylene diisocyanate; and diphenyl ether diisocyanate and cycloaliphatic diisocyanates such as dicyclohexylmethane diisocyanate. Triisocyanates which may be used include aromatic triisocyanates such as 2,4,6-triisocyanatotoluene and 2,4,4'-triisocyanatodiphenylether. Examples of other suitable organic polyisocyanates comprise the reaction product of an excess of a diisocyanate with polyhydric alcohols such as trimethylolpropane and uretedione dimers and isocyanurate polymers of diisocyanates for example of tolylene-2,4-diisocyanate. Mixtures of the polyisocyanates may be used. Examples of suitable mixtures include the polyisocyanate compositions obtained by the phosgenation of the mixed polyamine reaction products of formaldehyde and one or more aromatic amines such as aniline and orthotoluidine. Suitable isocyanate components are commercially available as Bayer Desmodur TH and Mondur CB from Mobay Chemical Co.

The polyesters which are suitable for use in this invention are those polyesters which are conventionally employed with polyfunctional isocyanates to form urethane coatings and are preferably the saturated polyesters terminating in hydroxyl groups. A large number of such materials are commercially available which are suitable for the purposes of this invention. Such saturated polyesters may be prepared by esterifying a dicarboxylic acid with a glycol under controlled conditions such that the resulting esters are terminated in hydroxyl groups and this is insured by employing an excess of the glycol. The resins are preferably in the form of liquids which can be readily mixed with the isocyanate ingredients and they may be either linear or branched polyesters. Somewhat better results, however, are obtained from using an admixture of substantially linear or low branched polyesters with polyesters which are highly branched. The products of inter-reaction of ethylene glycol, tri-methylene glycol, hexamethylene glycol and adipic, succinic, sebacic, or phthalic acids or mixtures of these acids with phthalic anhydride may be used satisfactorily. Polyfunctional reactants may also be employed to obtain the higher branch type of polyesters including glycerin, trimethylol propane, hexanetriol-1,2,6 or the polybasic acids or both. In most cases the use of one polyfunctional reactant is sufficient for example, reaction products of glycerol and phthalic acid and anhydride, when reacted under satisfactory conditions to form a highly branched reaction product, is highly satisfactory for the purpose of this invention. Non-limiting examples of the polyesters of the above type which can be used satisfactorily are the resins known commercially Multron R-2 and Multrathane R-14 available from Mobay Chemical Co.

The polyethers suitable for use in the present invention include those polyethers heretofore disclosed for the preparation of polyurethane elastomers in the prior art. As non-limiting examples of polyethers suitable for use in the process of this invention may be mentioned hydroxyl-terminated polymers and copolymers of cyclic oxides and especially of ethylene oxide, epichlorohydrin, 1:2-propylene oxide, 1:2-butylene oxide or other alkylene oxides, oxacyclobutane and substituted oxacyclo butane and tetrahydrofuran. Such polyethers may be linear polyethers, as are prepared, for example, by the polymerization of an alkylene oxide, in the presence of a glycol initiator. Alternatively there may be used branched polyethers prepared for example by polymerizing an alkylene oxide in the presence of a substance having more than two active hydrogen atoms, for example glycerol, pentaerythritol and ethylene diamine. Mixtures of linear and branched polyethers or mixtures of polyesters and polyethers may be used if desired. Non-limiting examples of polyethers of the above type which can be satisfactorily used are those known commercially as Niax Diol available from Union Carbide Corporation, PPG available from Jefferson Chemical Corporation and Foamrez ED available from Witco Chemical Corporation.

Particularly preferred for use in this invention are two thermoplastic self-curing polyurethane elastomers identified as ECD-387 and ECD-388 available from DuPont. The physical properties of these non-crosslinked elastomers are as follows:

TABLE 1.—ELASTOMERIC PROPERTIES OF ECD-387 AND ECD-388

|  | ECD-387 | ECD-388 |
| --- | --- | --- |
| Specific Gravity | 1.115 | 1.095 |
| Hardness (Durometer) | 80-84A | 67-70A |
| Tensile: |  |  |
| 100% Modulus, p.s.i | 875 | 450 |
| 300% Modulus, p.s.i | 1,450 | 825 |
| Tensile Strength, p.s.i | 6,500+ | 6,000 |
| Elongation at Break, percent | 650 | 750 |
| Permanent Set at Break, percent | 110 | 15 |
| Tear Strength: |  |  |
| Graves Die C, p.l.i | 610 | 425 |
| ASTM D-470, p.l.i | 120 | 85 |
| Resilience, percent: |  |  |
| Yerzley | 80 | 78 |
| Bashore Rebound | 60 | 45 |
| Abrasion Resistance: |  |  |
| NBS Index, percent | 385 | 180 |
| Tabor, CS-17, 1,000 gm | [1] 14 | [1] 12 |
| Flex Resistance: DiMattia, Nicked (flexes to 0.1" cut growth) | 350,000 | 250,000 |
| Compression Set, "B": |  |  |
| 22 hrs./70° C., percent | [2] 60 | 35 |
| 22 hrs./R.T., percent | 18 | 10 |
| Low Temperature, ° F.: |  |  |
| Torsional Modulus, $T_{10}^4$ (ASTM D-1053) | −75 | −67 |
| TR-50, 200% (ASTM D-1329) | 18 | −4 |
| Brittle Point (ASTM D-746) | −110 | −100 |
| High Temperature, p.s.i.: |  |  |
| 300% Modulus at 70° C | 1,000 |  |
| 300% Modulus at 100° C | 700 | 350 |
| Tensile Strength at 70° C | 4,000 |  |
| Tensile Strength at 100° C | 2,500 | 1,500 |

[1] Mg./1,000 rev.
[2] Recoverable on heating.

The process of this invention advantageously permits preparations of deposited latex rubber articles by conventional dipping techniques either with or without control of thickness in the deposited layers of latex by use of coagulants. In practice, it is often desirable to make the total thickness of an article made of deposited latex rubber smaller by an amount approximately corresponding to the thickness of the subsequently applied polyurethane elastomer coating. In general, shaped deposited latex articles made by dipping have film thicknesses which may vary from on the order of one or two-hundredths of an inch up to a few tenths of an inch. Typical polyurethane elastomer coating thicknesses are from about .001 to about .005 inch. It will be appreciated that the thickness of either the base layer or coating can be varied over wide limits to suit a particular application.

Similarly, in the embodiment of the invention resulting in the preparation of latex threads by conventional extrusion techniques, it is optional, but preferred, to make the total diameter of the base thread smaller by an amount approximately corresponding to the thickness of the polyurethane elastomer coating. As above, typical polyurethane elastomer coating thicknesses are from about .001 to about .005 inch.

In accordance with this invention, the uncured deposited rubber latex, i.e., the coating of latex on the dipped form, the extruded rubber latex thread, or a form per se, is treated with a coagulating medium comprising a polyurethane elastomer in solution in a protonating solvent. The protonating solvent is a proton donating substance which, as described, is both a solvent for the urethane elastomer and a coagulant for natural and synthetic rubber latices. Saturated monocarboxylic acids containing one to four carbon atoms are particularly suitable as protonating solvents, i.e., formic, acetic, propionic, or butyric acid. In general, formic acid or acetic acid is preferred as the protonating solvent used herein. In addition to the foregoing, ethanol and its homologs are also effective protonating solvents. Advantageously, it has been found that a high salt content can be tolerated by a solution of a polyurethane in such alcoholic protonating solvents. Therefore, conventional salt-in-alcohol coagulants, e.g., 5–10% calcium nitrate, which in some instances are preferred over acid coagulants, can be employed in the process of this invention.

It has been found that the coagulant systems containing an acid protonating solvent have a high tolerance for water, with amounts as high as 40 to 50% by volume of water content being found operable. In some instances, it has been determined that a relatively small amount of water, e.g., 5 to 10% by volume of water content, improves the coagulating qualities of the protonating solvent.

It has also been determined that the concentration of urethane polymer in the protonating solvent used as a coagulant is preferably relatively high in order to produce better and more well defined polyurethane films codeposited with the latex rubber. Thus, solutions of at least about 5% by weight of polyurethane polymer are usually employed as a coagulant. While solutions containing about 5% by weight of polyurethane polymer evidence effective film forming properties, it is found that a polyurethane polymer content of about 15% by weight is the order of magnitude required to provide particularly satisfactory films. The upper limit of the polyurethane elastomer solids content in the protonating solvent is determined primarily by the maximum amount of said polymer able to be dissolved in said protonating solvent and the resulting viscosity of the solution.

In accordance with this invention, the preferred method of assuring a continuous protective polyurethane elastomer film is to first deposit the polyurethane-protonating solvent solution onto the form utilized and then dip the form into the rubber latex bath with a minimum dry time between each dip. It has been found, however, that as nearly as effective results can be obtained if the reverse procedure is followed, that is, the latex film is first deposited on the form utilized followed by the polyurethane-protonating solvent solution or coagulant dip. In this latter case, a more effective film is formed if there is a delay, e.g., about 5 to 30 minutes between the last latex dip and the entry into the polyurethane solution. In this manner there is sufficient delay so as to allow the deposited latex film to "set up," i.e., partially cure.

It is found, however, that the physical properties of articles resulting from either sequence of operation exhibit properties comparable to each other. In addition to the above-mentioned dipping operations, the latex or polyurethane polymer may be applied to the form utilized either by spraying or any other suitable manner of application which will impart a coating of relatively uniform thickness and which will result in complete coverage of the form utilized or of the substrate if such has been applied. It is obvious, however, that irregardless of the manner of application the thickness of the coating may be controlled by variation in viscosity of the solution, i.e., polyurethane-protonating solvent solution or latex solution, which in turn is generally determined by the solids content thereof.

After dipping, spraying, and the like, the resulting article is subjected to curing conditions for the purpose of curing the polyurethane polymer and vulcanizing the latex rubber. This is suitably accomplished at elevated temperatures of about 150° to 300° F. with curing times of from about 15 minutes or one-half hour up to as much as 24 hours. Usually shorter times are utilized at the higher temperatures. It has been determined that for most consistently obtained optimum cure and adhesion results, the curing is conducted without any appreciable delay. This curing may be accomplished with any suitable equipment, for example, hot air circulating ovens, infrared banks, or induction coils.

It has also been found that in some instances fixed alkali stabilization of the latex improves the cure rate of the composite articles of this invention. Thus, it will be appreciated that specific curing conditions will be, in part, dependent on the formulation of the latex and on the protonating solution involved.

As heretofore stated, the present invention provides codeposited latex rubber-polyurethane articles having strongly adherent bonds of a type not heretofore encountered. While not wishing to be restricted by theorization, it is believed that the greatly improved bonding results from an intermingling of the latex rubber layer with the adjacent polyurethane layer. Hence, when the latex is coagulated, the layers, in effect, coalesce causing an interlocking of the latex rubber with the polyurethane. In other words, it is believed that, contrary to the crosslinking per se heretofore effected by the use of adhesives and the like, an alloying of the latex rubber-polyurethane elastomer abutting layers is effected.

The following examples are intended to be illustrative of this invention and are not to be considered as limitations thereof.

EXAMPLE I

A latex compound formula typical of that type which will respond to the codeposition process of this invention was prepared. The latex was a blend of 100 parts by weight (dry solids basis) of a centrifuged natural rubber latex, 62% solids; with 0.5 part of a 20% solution of potassium hydroxide, 1.5 parts of a 50% dispersion of sulfur, 1.0 part of a 50% aqueous dispersion of zinc oxide, 0.5 part of a 50% aqueous dispersion of zinc dimethyl dithiocarbamate, 0.5 part of a 50% aqueous dispersion of a zinc salt of 2-mercaptobenzothiazole, and 10.0 parts of a 50% aqueous dispersion of titanium dioxide, and 1.0 part of a 40% aqueous dispersion of 2,2' methylene bis (4-methyl-6-tertiary butyl phenol).

Latices substantially similar to those produced above were employed in a series of experiments in order to illustrate the physical properties, i.e., modulus, tensile strength, elongation, delamination resistance, etc., of rubber article produced with the use of the novel polyurethane solvent coagulant systems of this invention.

In these experiments, different sequences of operations were employed in which plate forms were dipped into a bath of rubber latex one or more times and then dipped into a bath of coagulant. As used herein the term "straight dip" refers to the practice of dipping a plate into a bath of latex, removing the plate from the bath and immediately redipping the plate into the latex without allowing the previous layer of latex to set up.

The method employed in the testing of the materials is identified as the "Tension Testing of Vulcanized Rubber," ASTM designation D412–51T. The definitions of the pertinent tests are as follows:

"Modulus" is defined as the force per unit of original cross-sectional area required to stretch a specimen to a stated elongation. It is expressed as pounds per square inch at the stated elongation, for example, 1000 p.s.i. at 500 percent elongation.

"Tensile Strength" is defined as the force per unit of the original cross-sectional area which is applied at the time of the rupture of a specimen. It is calculated by dividing the breaking force in pounds by the cross-section of the unstressed specimen in square inches. For example, if a specimen having a cross-section 0.25 by 0.10 inch broke at a force of 50 pounds, the tensile strength would be 50 divided by the original cross-sectional area (0.25 x 0.10) which is equal to 2000 p.s.i.

"Elongation" is defined as the extension between marks on the specimen produced by a tensile force applied to a specimen, and is expressed as a percentage of the original distance between the marks at the moment of rupture. For example, if a 1-inch length is marked on a specimen and it is stretched until the marks are 7 inches apart; the elongation is: 7–1=6 inches or 600 percent.

"Set," at break, is the set determined on the specimen when stretched to rupture. Ten minutes after the specimen is broken the two pieces are fitted together so that they are in contact over the full area of the break. The distance between the marks is measured. It is expressed as a percentage of the original length or distance between marks. For example, a specimen is stretched from 1 inch to 5 inches at rupture. Its length after a 10 minute rest period is 1.2 inch. The set is 0.20 inch or 20 percent.

"Tear" is determined by the crescent tear test in which a crescent-shaped piece of definite size is cut from a specimen with a die. A small slit is made in the inner curved surface of the specimen. It is then placed in a tensile machine and loaded to rupture. The load required to separate the specimen is used in calculating the resistance to tear.

In addition, flex tests were conducted to determine the number of flexes required to break the sheets produced by the process.

The following data illustrates a comparison of the physical properties of cured sheets deposited while employing protonating solvents as coagulants with and without urethane polymer. (ECD–388 urethane elastomer commercially available from DuPont). In all cases there was no delamination of the composite articles produced and their physical properties were comparable to the samples produced without a film of polyurethane. The test results are presented below in tabular form.

TABLE 2 — PHYSICAL PROPERTIES OF CURED FILMS DEPOSITED USING COAGULANTS WITH AND WITHOUT ECD–388 URETHANE POLYMER

| Dip Procedure | Modulus (p.s.i.) at percent of Original Length | | | Tensile, Ultimate | | | |
|---|---|---|---|---|---|---|---|
| | 300% | 500% | 700% | Ultimate (p.s.i.) | Percent Elong. | Percent Set | Tear (lbs./in.) |
| 2 Straight Dips plus Latex plus Coagulant: | | | | | | | |
| ECD–388 in acetic acid [1] | 235 | 540 | 2,091 | 4,278 | 856 | 8 | 156 |
| Acetic acid [2] | 208 | 505 | 1,955 | 4,038 | 850 | 7 | 186 |
| Salt coagulant [3] | 211 | 450 | 1,651 | 3,795 | 863 | 9 | 281 |

Coagulants used:
[1] 5% ECD–388 in 87½% acetic acid/12½% water.
[2] 87½% acetic acid/12½% water.
[3] Calcium nitrate in denatured ethanol.

TABLE 2—Continued

FLEX TEST COMPARISONS

|  | 25% Elong. | 50% Elong. |
|---|---|---|
| 2 Straight Dips plus Latex plus Coagulant: |  |  |
| ECD-388 in acetic acid | *132,840 | 39,053 |
| Acetic acid alone | 132,840 | 81,263 |
| Salt coagulant | 132,840 | 63,038 |

*Test stopped, no breaks occurred.

The foregoing data illustrate that even 5% by weight solutions of the urethane polymer produced composite sheets superior to the prior art sheets, without any coating of polyurethane.

14—Same as (12) but with 20° room temperature dry before going into coagulant
18—Two straight dips+coagulant+latex TABLE 3.—PHYSICAL PROPERTIES OF CURED FILMS DEPOSITED USING 5% AND 10% ECD-388 IN 95/5 FORMIC ACID/WATER SOLUTION AS COAGULANT

| Dip Procedure | Modulus (p.s.i.) at Percent of Original Length | | | Tensile, Ultimate | | | |
|---|---|---|---|---|---|---|---|
|  | 300% | 500% | 700% | Tensile (p.s.i.) | Percent Elong. | Percent Set | Tear (lbs./in.) |
| 5% EDC-388: |  |  |  |  |  |  |  |
| 10 | 60 (120) | 105 (245) | 250 (815) | 440 (1,590) | 830 (850) | 103 (8) | 45 (105) |
| 12 | 200 (175) | 440 (395) | 1,665 (1,355) | 3,835 (2,745) | 865 (760) | 6 (4) | 225 (115) |
| 14 | 225 (120) | 500 (520) | 1,980 (2,080) | 4,145 (3,285) | 855 (805) | 5 (4) | 330 (110) |
| 18 | 100 (150) | 155 (315) | 395 (1,010) | 1,050 (2,380) | 920 (890) | 53 (8) | 65 (115) |
| 10%ECD-388: |  |  |  |  |  |  |  |
| 10 | 160 (155) | 400 (205) | 1,285 (510) | 2,685 (635) | 860 (675) | 17 (-) | 285 (160) |
| 12 | 200 (215) | 455 (440) | 1,730 (1,635) | 4,300 (2,720) | 875 (800) | 4 (5) | 300 (115) |
| 14 | 200 (180) | 420 (385) | 1,650 (1,270) | 4,375 (2,855) | 895 (855) | 4 (6) | 355 (130) |

Note.—Figures in parentheses are for 2 weeks oven aged (70° C.) samples.

EXAMPLE II

An additional series of experiments were run in order to illustrate a comparison of the composite articles produced with 5% by weight solutions of polyurethane elastomer and with 10% by weight solutions in formic acid and water. The following data evidences a marked improvement in physical properties concomitant with increase in polymer content. It should be noted that even the less preferred method of dipping, i.e., coagulant-latex-coagulant, produces sheets comparable to those heretofore known. The dip procedures employed were as follows:

Dip procedure code

10—Coagulant+latex+coagulant
12—10 mil straight dip+latex+coagulant

As shown above the composite sheets have good physical properties. No delamination occurred.

EXAMPLE III

Another series of experiments similar to those of Example II were run, except that an 87.5% acetic acid-12.5% water solution was utilized as protonating solvent for effecting coagulation of the rubber latex. As in Example II, specimens were oven-aged for two weeks at 70° C. and evidenced little or no adverse affects and in most cases actually evidenced a marked improvement. The dip procedures employed were as follows:

Dip procedure code

21—Coagulant+latex+coagulant
22—10 mil straight dip+latex+coagulant
24—Same as (22) but with 20° room temperature dry before going into coagulant
25—Coagulant+latex TABLE 4.—PHYSICAL PROPERTIES OF CURED FILMS DEPOSITED USING 10% ECD-388 IN 87.5% ACETIC ACID/12.5% WATER SOLUTION AS COAGULANT

| Dip Procedure | Modulus (p.s.i.) at Percent of Original Length | | | Tensile, Ultimate | | | |
|---|---|---|---|---|---|---|---|
|  | 300% | 500% | 700% | Tensile (p.s.i.) | Percent Elong. | Percent Set | Tear (lbs./in.) |
| 21 | 205 (295) | 495 (860) | 1,770 (2,965) | 2,925 (3,500) | 810 (750) | 8 (5) | 295 (180) |
| 22 | 275 (355) | 680 (1,090) | 2,790 (4,210) | 4,725 (4,210) | 820 (700) | 6 (4) | 330 (150) |
| 24 | 265 (365) | 620 (1,020) | 2,465 (4,040) | 4,740 (4,320) | 815 (725) | 4 (5) | 265 (175) |
| 25 | 235 (260) | 510 (620) | 1,730 (2,115) | 3,605 (2,975) | 860 (775) | 4 (4) | 375 (170) |

Note.—Figures in parentheses are after aging 2 weeks at 70° C.

EXAMPLE IV

An additional series of experiments were run employing a coagulant system comprised of 10% by weight calcium nitrate in an ethanol solvent. In half of the experiments 10% by weight of the polyurethane elastomer (ECD-388) employed in the previous examples was utilized. It will be noted that the calcium nitrate-ethanol solution containing the polyurethane elastomer produced physical properties, upon testing, comparable to films employing a standard coagulant system, i.e., 10% $Ca(NO_3)_2$ in ethanol. The resulting data are presented in tabular form in Table 5. The dip procedures utilized were as follows:

Dip procedure code

31—Coagulant dipped on plate followed by latex dip
32—Coagulant+latex+coagulant
33—Straight dipped latex+latex+coagulant
34—Straight dipped latex+latex+20° room temperature dry before going into coagulant
35—Like (33)+20° room temperature dry plus redip in coagulant TABLE 5.—PHYSICAL PROPERTIES OF CURED FILMS DEPOSITED WITH OR WITHOUT USING 10% ECD-388/Ca(NO₃)₂/ETHANOL SOLUTION AS COAGULANT

| Dip Procedure | Modulus (p.s.i.) at Percent of Original Length | | | Tensile, Ultimate | | | |
|---|---|---|---|---|---|---|---|
| | 300% | 500% | 700% | Tensile (p.s.i.) | Percent Elogn. | Percent Set | Tear (lbs./in.) |
| 31—ECD Coag | 263 (320) | 600 (790) | 2,117 (2,945) | 3,550 (3,445) | 850 (740) | 6 (5) | 395 (205) |
| Std. Coag | 248 (270) | 653 (605) | 2,335 (2,130) | 4,142 (3,175) | 817 (800) | 5 (4) | 275 (120) |
| 32—ECD Coag | 270 (345) | 553 (870) | 1,937 (3,205) | 3,900 (3,260) | 850 (710) | 5 (4) | 305 (170) |
| Std. Coag | 267 (335) | 695 (1,060) | 2,472 (____) | 3,200 (2,855) | 755 (675) | 4 (2) | 205 (135) |
| 33—ECD Coag | 275 (285) | 648 (645) | 2,467 (2,275) | 4,745 (4,045) | 850 (835) | 6 (6) | 318 (165) |
| Std. Coag | 292 (320) | 683 (780) | 2,655 (2,885) | 4,497 (3,590) | 825 (760) | 7 (5) | 298 (175) |
| 34—ECD Coag | 250 (285) | 625 (695) | 2,362 (2,415) | 4,843 (3,770) | 863 (815) | 5 (7) | 390 (180) |
| Std. Coag | 308 (345) | 795 (935) | 2,955 (3,285) | 4,447 (3,285) | 783 (700) | 5 (6) | 169 (185) |
| 35—ECD Coag | 257 (285) | 600 (705) | 2,345 (2,415) | 4,370 (3,820) | 858 (835) | 7 (7) | 473 (170) |
| Std. Coag | 288 (285) | 682 (715) | 2,697 (2,560) | 4,537 (3,800) | 817 (790) | 4 (5) | 256 (205) |

NOTE.—Figures in parentheses are for 2 weeks oven aged (70° C.) samples.

EXAMPLE V

In order to illustrate the ozone resistance of articles coated in accordance with this invention a number of specimens of latex rubber strips were stretched to various extents relative to their ultimate elongation. Thus, a series of specimens were stretched to 30%, 40%, 50%, 60%, 70%, and 80% of ultimate elongation respectively. Of these specimens, half were coagulated in accordance with this invention, i.e., employing a 10% by weight solution of ECD-388 in 95/5 formic acid/water solution as coagulant. All specimens were subjected to prolonged contact with ozone until either the treated or untreated sample failed or reached near-failure. In each instance the specimen treated in accordance with this invention illustrated far superior ozone resistance than the untreated specimens.

EXAMPLE VI

In order to illustrate the adaptability of the process of the instant invention a series of latices are extruded through conventional extrusion apparatus into a coagulation bath comprising a 15% by weight solution of ECD-387 (commercially available from Du Pont) in a 90/10 acetic acid/water solvent. The resulting threads are coated with a strongly adherent coating of polyurethane elastomer and such threads exhibit tensile stress and strain characteristics comparable to non-coated latex threads.

Considerable modification is possible in the selection of the additional components of the solvent/coagulant system of the present invention, as well as in the particular techniques followed in carrying out said invention without departing from the scope thereof.

What is claimed is:

1. A composite article of latex rubber and polyurethane which comprises at least one layer of latex rubber bonded to at least one layer of polyurethane elastomer, said layers of latex rubber and polyurethane having been codeposited from an aqueous dispersion of the rubber latex and a solution containing the polyurethane dissolved in a solvent which is a coagulant for the rubber latex.

2. The article of claim 1 in which the rubber latex is selected from the group consisting of natural and synthetic rubbers and mixtures thereof.

3. The article of claim 1 in which the solvent is a saturated monocarboxylic acid containing from one to four carbon atoms.

4. The article of claim 3 in which said acid solvent contains up to about 50 percent by volume of water.

5. The article of claim 1 in which the solvent is ethanol.

6. A coated rubber article comprising a body of coagulated rubber latex and an adherent coating of a polyurethane elastomer, said elastomeric coating having been codeposited with said body of coagulated rubber latex from a solution comprising at least 5 percent by weight of a urethane polymer in a protonating solvent.

7. The article of claim 6 in which said protonating solvent is a proton donating substance capable of dissolving said polyurethane and of coagulating said rubber latex from an aqueous dispersion.

8. The article of claim 6 in which said protonating solvent is formic acid.

9. The article of claim 6 in which the protonating solvent is acetic acid.

10. The article of claim 6 in which the protonating solvent is ethanol having dissolved therein about 5 to 10 percent by weight of calcium nitrate.

11. A deposited rubber latex substrate having a strongly adherent coating of elastomeric polyurethane thereon, said substrate having been coagulated by a solvent solution comprising a protonating solvent with a urethane polymer dissolved therein.

12. A polyurethane film bonded to a rubber substrate which comprises a body of polyurethane removed from solution in a protonating solvent during coagulation of said rubber substrate by said protonating solvent.

13. An extruded latex rubber article having a strongly adherent coating of elastomeric polyurethane thereon, said extruded article having been coagulated by a solvent solution comprising a protonating solvent with a urethane polymer dissolved therein.

14. The article of claim 13 in which the protonating solvent is a proton donating substance capable of dissolving said polyurethane and of coagulating said latex rubber from an aqueous dispersion.

15. A process for producing composite articles of elastomeric polyurethane and latex rubber which comprises effecting codeposition of a layer of latex rubber from an aqueous dispersion thereof and a layer of polyurethane elastomer from a solution containing a solvent which dissolves said polyurethane and coagulates said dispersion of rubber latex.

16. A process for producing rubber articles coated with a film of elastomeric polyurethane which comprises applying an aqueous dispersion of rubber latex onto a form, treating the coated form with a solution containing a polyurethane elastomer dissolved in a protonating solvent whereby said latex is coagulated and a film of said polyurethane is deposited on said coagulated latex, and thereafter curing said coated latex.

17. The process of claim 16 in which said protonating solvent is a proton donating substance capable of dissolving said polyurethane and of coagulating said rubber latex from an aqueous dispersion.

18. The process of claim 16 in which said protonating solvent is a saturated monocarboxylic acid containing from one to four carbon atoms.

19. The process of claim 18 in which said acid solvent contains up to 50 percent by volume of water.

20. The process of claim 16 in which said protonating solvent is ethanol.

21. The process of claim 20 in which said protonating solvent is ethanol having dissolved therein about 5 to 10 percent by weight of calcium nitrate.

22. The process of claim 16 in which said dispersion of rubber latex is allowed to set up prior to the application of the solution of urethane polymer.

23. The process of claim 16 in which the rubber latex dispersion and the coating of urethane polymer applied thereto are cured at a temperature of about 150° to about 300° F.

24. The method of producing extruded latex rubber threads coated with polyurethane elastomers which comprises extruding a thread comprising a dispersion of rubber latex into a coagulant bath containing a urethane polymer dissolved in a solvent, said solvent being a coagulant for said extruded rubber latex whereby said latex is coagulated and coated with a film of the polyurethane, and thereafter removing said coated thread from said bath.

References Cited
UNITED STATES PATENTS

| | | | |
|---|---|---|---|
| 2,814,834 | 12/1957 | Hess et al. | 18—58.6 |
| 3,090,716 | 5/1963 | Stevens | 161—190 |
| 3,098,755 | 7/1963 | Barth et al. | 117—138.8 |
| 3,234,061 | 2/1966 | Gardner | 156—93 |
| 3,255,492 | 6/1966 | Velonis et al. | 18—41 |
| 3,298,034 | 1/1967 | Szegvari | 264—255 X |

EARL M. BERGERT, *Primary Examiner.*

C. B. COSBY, *Examiner.*

UNITED STATES PATENT OFFICE
CERTIFICATE OF CORRECTION

Patent No. 3,382,138            May 7, 1968

Harry J. Barth

It is certified that error appears in the above identified patent and that said Letters Patent are hereby corrected as shown below:

Columns 9 and 10, TABLE 3, first column, line 1 thereof, "EDC" should read -- ECD --; same TABLE 3, fifth column, line 4 thereof, "1,050 (2,380)" should read -- 1,050 (2,280) --.

Signed and sealed this 28th day of October 1969.

(SEAL)

Attest:

Edward M. Fletcher, Jr.            WILLIAM E. SCHUYLER, JR.

Attesting Officer                   Commissioner of Patents